(12) United States Patent
Valum

(10) Patent No.: US 10,143,145 B2
(45) Date of Patent: Dec. 4, 2018

(54) APPARATUS AND METHOD FOR TRAINING PLANTS

(71) Applicant: Benjamin J. Valum, Custer, WA (US)

(72) Inventor: Benjamin J. Valum, Custer, WA (US)

( * ) Notice: Subject to any disclaimer, the term of this patent is extended or adjusted under 35 U.S.C. 154(b) by 186 days.

(21) Appl. No.: 14/998,765

(22) Filed: Feb. 12, 2016

(65) Prior Publication Data

US 2016/0353676 A1 Dec. 8, 2016

Related U.S. Application Data

(60) Provisional application No. 62/176,378, filed on Feb. 13, 2015.

(51) Int. Cl.
*A01G 9/12* (2006.01)

(52) U.S. Cl.
CPC ...................... *A01G 9/12* (2013.01)

(58) Field of Classification Search
CPC .......... A01G 9/12; A01G 9/122; A01G 9/124; A01G 9/126; A01G 9/128
USPC ...................................................... 211/181.1
See application file for complete search history.

(56) References Cited

U.S. PATENT DOCUMENTS

| | | | |
|---|---|---|---|
| 1,024,910 A | 4/1912 | Sanford | |
| 1,338,612 A | 4/1920 | Buschardt | |
| 1,766,094 A | 6/1930 | Bauer | |
| 1,890,217 A | 12/1932 | Dobbins | |
| 1,976,094 A | 10/1934 | Ritchie | |
| 2,000,911 A | 5/1935 | Balousek | |
| 2,577,373 A | 12/1951 | Smith | |
| 2,584,637 A | 2/1952 | Sprinkle | |
| 2,888,938 A | 6/1959 | St. Hilaire | |
| 3,082,773 A | 3/1963 | Renstrom et al. | |
| 3,205,902 A | 9/1965 | Waggener | |
| 3,298,073 A | 1/1967 | Merfeld | |
| 3,518,791 A | 7/1970 | Carson et al. | |
| 4,333,264 A | 6/1982 | Smrt | |
| 4,509,289 A * | 4/1985 | Fogelson | A01G 9/124 248/519 |
| 4,860,489 A | 8/1989 | Bork | |

(Continued)

FOREIGN PATENT DOCUMENTS

| | | | |
|---|---|---|---|
| CA | 2792457 | 4/2013 | |
| CH | 638077 A5 * | 9/1983 | ............... A01G 9/12 |

(Continued)

*Primary Examiner* — Troy Chambers
*Assistant Examiner* — Morgan T Barlow

(57) ABSTRACT

An apparatus and method for controlling apical growth of plants without cutting or pinching so as to increase productivity and efficiently utilize growth resources. A coiled frame is provided having the form of mirror image/opposed Fibonacci or Golden Spirals that expand from a first starting point and then contract back to a second starting point by an approximately similar number of quarter-turns at a selected pitch, the spring suitably being formed of a single length of wire. The apical growth tip of the plant is bent to meet the frame at selected locations and attached progressively as growth proceeds, using ties or other connectors. A stake inserted through the starting points of the spiral attaches the frame to the medium in which the plant is rooted. The stake is preferably angled so that the plant maximizes utilization of available light, for example, approximately 80° to the surface of the medium.

19 Claims, 17 Drawing Sheets

(56) References Cited

U.S. PATENT DOCUMENTS

| | | |
|---|---|---|
| 4,984,407 A | 1/1991 | Ziehmer |
| 5,048,231 A | 9/1991 | Brown |
| 5,174,060 A | 12/1992 | Glamos |
| 5,210,973 A | 5/1993 | Kratky et al. |
| 5,349,780 A | 9/1994 | Dyke |
| 5,412,905 A | 5/1995 | Allison |
| D387,637 S | 12/1997 | Salgy |
| D404,072 S * | 1/1999 | Ford .................... D19/86 |
| 5,979,110 A | 11/1999 | Tai |
| 6,000,172 A | 12/1999 | Ballarino |
| D418,725 S | 1/2000 | Evans |
| D420,554 S | 2/2000 | Evans |
| 6,209,258 B1 | 4/2001 | Schneider |
| 6,378,175 B1 | 4/2002 | Vanderpan |
| 6,389,656 B1 | 5/2002 | Pellikaan |
| 6,936,314 B1 | 8/2005 | Schultz |
| 7,043,876 B2 * | 5/2006 | LaPelusa ............ A01G 9/12 47/47 |
| D533,107 S | 12/2006 | King |
| 7,152,367 B2 | 12/2006 | Mastronardi |
| 7,331,140 B1 | 2/2008 | Mason |
| 7,373,940 B1 | 5/2008 | Lloyd |
| 7,559,125 B2 | 7/2009 | Cofer |
| 7,624,534 B1 | 12/2009 | Maeder |
| 7,918,051 B2 | 4/2011 | Early |
| D657,159 S | 4/2012 | Rosaen |
| D698,097 S * | 1/2014 | Muhr .................... D30/124 |
| D736,559 S * | 8/2015 | Enghard ................ D7/213 |
| D753,281 S * | 4/2016 | Baston .................. D23/355 |
| 2003/0110686 A1 * | 6/2003 | McDowell ............ A01G 9/12 47/46 |
| 2010/0299892 A1 | 12/2010 | Ardern |

FOREIGN PATENT DOCUMENTS

| | | | |
|---|---|---|---|
| CN | 201657735 | 12/2001 | |
| CN | 202552613 | 11/2012 | |
| DE | 631947 C * | 6/1938 | ............ A01G 9/12 |
| DE | 202010014145 U1 * | 2/2011 | ............ A01G 9/12 |
| FR | 2057500 A5 * | 5/1971 | ............ A01G 9/122 |
| GB | 191302055 A * | 12/1913 | ............ A01G 9/12 |
| GB | 716314 A * | 10/1954 | ............ A01G 9/12 |
| GB | 933282 A * | 8/1963 | ............ A01G 9/12 |
| GB | 2098043 A * | 11/1982 | ........... A01G 9/124 |
| WO | WO9922587 | 5/1999 | |
| WO | WO2014115132 | 7/2014 | |

* cited by examiner

APPARATUS AND METHOD FOR TRAINING PLANTS

RELATED APPLICATIONS

This application claims the benefit of U.S. Provisional Patent Application Ser. No. 62/176,378 filed on Feb. 13, 2015.

BACKGROUND a. Field of the Invention

The present invention relates generally to frames and similar structures that support growing plants, and, more particularly, to a coiled frame that trains the plant in a manner that allows control of apical dominance to be achieved in an efficient, cost-effective and low stress manner.

b. Related Art

Farmers and gardeners look for ways of increasing conditions and improving quality in their plants. Providing a plant with optimum environmental (e.g., water, light, soil/medium, $CO_2$) and nutritional support can go a long way towards achieving these goals. Beyond meeting a plant's environmental and nutritional needs, gardeners also often explore and employ methods of training to take a plant's yield and quality to a higher level.

Certain fast growing plants, such as tomatoes for example, can benefit from increased branching. Also it can be advantageous to have evenly proportioned branches, as compared to apical dominance. Apical dominance refers to the process wherein the axillary buds (side or lateral shoots) remain dormant and are reserved by the auxin (plant hormone) that is produced by the apical shoot. When a plant's apical shoot is left intact and unbent the plant tends to take on a conical shape much like a Christmas tree, which is unsatisfactory for production of many vegetables and other crops.

Removing apical dominance is achieved by either cutting (also referred to as pinching, pruning, topping and heading off) or bending of the plant's apical shoot. Cutting or bending the apical shoot removes the auxin's inhibitory effect on the axillary shoots so that growth of the latter is enhanced. Depending on the desired size of plant, and in order to distribute hormones and resources as evenly as possible among the branches/shoots, further pinching or bending may be necessary. This results in an increased number of equally proportioned branches and aids in training the plant for improved quality and increased yield. The shape of a plant trained in this manner is often that of an inverted cone.

Removing growing shoots by cutting and pinching is perhaps the least time consuming method of training plants commonly employed by growers. Gardeners often use a form of shears to remove a growing tip (some may use only their hands and/or finger nails for smaller shoots). However, there are significant drawbacks to cutting a stem or stalk of a plant. First, an open wound left behind where cutting took place, leaving a plant exposed to infection or disease until the wound is healed. Second, growth vigor is lost while the plant repairs the injury and redirects growth hormone to other shoots/branches. In combination this results in lost time and growth opportunity during healing and redistribution of growth/hormone, which in turn may reduce yield and quality (if dealing with natural growing seasons), or may increase the time to harvest (if climate and environmental controls are in effect). As an additional drawback, auxins are transported down the stem to the roots; loss of auxin, due to removing an apical shoot, may result in less stimulated root growth and root branching.

An alternative to pinching/cutting is bending. This can take various forms, from simply folding a growth shoot over, to attaching it to stakes trellis, netting or wires (e.g., an espalier), wrapping and bending with wire (e.g. bonsai), pulling it down and applying hanging weights, tying it down with cordage and stakes, and so on. After a growth shoot is bent it will immediately begin turning itself vertical again due to the effect of gravitropism (plant shoots display negative gravitropism; when placed on its side, a plant shoot will grow up against gravity) and will soon require further bending. Bending is advantageous relative to cutting in that it does not create an open wound and no auxin is lost. The main drawback of bending is that when using conventional techniques it is often much more time-consuming than cutting. This is a particular problem in commercial operations dealing with large numbers of relatively fast-growing plants, where the labor intensive aspects of conventional bending approaches become greatly compounded.

Commercial growers also often use artificial lighting, in whole or in part, to expedite growth as compared with the natural growing season, and the cost of electricity creates the need to use the artificial light efficiently. Reducing the amount of time and electricity to produce crops requires that plants not be subjected to cutting for controlling apical dominance, in order to retain auxin and shorten the time from seed to harvest. Being able to adjust the orientation/angle of the plants may also help maximize utilization of light sources. Furthermore, for a variety of reasons pots or other containers are conventionally used to grow plants in commercial environments, and in order for a training technique/device to be most useful it is desirable that the containers remain individually mobile, rather being attached to trellises or other structures that interconnect plants such that they and their containers are not easily moved about.

Thus, while prior methods of pruning and training are effective in increasing the number of evenly proportioned branches and therefore productivity, the drawbacks/limitations that are inherent to such methods leave a significant void when it comes to overcoming apical dominance in a rapid and efficient manner.

Therefore, a need exists for a method and apparatus that overcomes apical dominance while reducing the amount of stress placed on the plant from training. Furthermore, there exists a need for such a method and apparatus that is easy to learn and that can be implemented in a rapid and efficient manner, especially when working with multiple plants. Still further, there exists a need for such a method and apparatus that facilitates efficient and economical use of lighting and other growing resources. Still further, there exists a need for such a method and apparatus that may be implemented using structural components that are economical to manufacture and transport, and that are adequately durable and long-lasting to permit reuse if desired.

SUMMARY OF THE INVENTION

The present invention addresses the needs noted above, and concerns the growing and training of climbing, vining, branching, flowering, and fruiting plants, such as tomatoes or other vegetables or fruits, for example.

The invention controls apical dominance and achieves a number of relatively evenly proportioned branches/growing shoots, without the drawbacks of cutting/pinching and without the labor-intensive and time-consuming aspects of conventional bending practices. The structure employed is mobile and if desired can be set up in an individual pot or other container so plants may be moved about as needed or desired. Apical shoots are not cut off, so auxin is not lost and growth vigor is maintained, resulting in shortened time frames from seed to harvest and minimization of resource consumption and days/hours of labor. In a preferred embodiment the invention is self-guiding/instructing in design and is therefore easily learned and implemented in small- or large-scale applications.

In a first aspect the invention provides a spring-shaped, or coiled, frame, suitably formed of wire, referred to from time to time herein as simply a "spring." The spring may take the shape of a Fibonacci or Golden Spiral that expands from a first center/starting point for a determined number of quarter turns, from which point the spring may contract by a similar number of quarter turns to a second center point so as to create two substantially symmetrical mirrored/opposed Golden Spirals. Preferably, the entire spring, including both Golden Spirals, may be formed of a single length of wire. A pitch may be applied to the spirals, for example by elevating one of the center points while the other remains fixed. Both the pitch and number of quarter turns the spirals make may be increased or decreased to accommodate various applications, uses and types of plants.

Depending upon dimensions and use of the spring, attachment portions may be applied to the center point of each spiral that permit the spring to be attached to a stake or pole member that is inserted through both center points and into the soil or medium below. The attachment points may be continuations of the wire spring, and may be angled out from both the bottom and top spiral center points. The stake may be oriented at a selected angle to the soil line, for example, by an angle of approximately 80° off the soil line in a preferred embodiment. The proximity of the spring to the soil line may be adjusted by sliding the spring up or down the angled stake; once the desired position is reached, the attachment points may be secured to the angled stake, using cable ties or other connectors, for example. The angled stake may be supported by a second stake by positioning a second stake to meet with the top of the angled stake so that the arrangement results in a triangle, with the stakes making up two sides and the soil line the third.

The present invention also provides a method for enhanced production from plants using controlled apical growth. In one aspect, a young plant may be positioned in the soil/medium near the center point of the spring closest to the soil/medium line and the plant allowed to grow vertically until its apical growth tip is above where it is to be attached to the spring frame as described above. Since bending the very tip of a growth shoot could result in snapping or splitting of the stem, it is preferable to bend further down the stem where tissues are more durable and hardened. At the point where the stem is sufficiently durable and in the proper position, a movement it may be made to bend the plant and the tip is then attached to the spring, using clips, twist ties or other connectors, for example. After the bend is made the plant may be left alone for a period of time so as to allow the plant to reorient to the new position and harden before bending again. As the growth rate of the plant increases, the wait time between bends may be reduced. The original apical shoot may be tied back down to the spring again and again while the axillary shoots are exposed to the light and their growth is thereby enhanced. Training to the spring may be continued until the plant has the desired number of shoots and the original apical shoot may then be allowed to grow vertically for the remainder of the plant's life cycle.

These and other features and advantages of the present invention will be more fully appreciated form a reading of the following detailed description in connection with the accompanying drawings.

DETAILED DESCRIPTION

Figure 1:
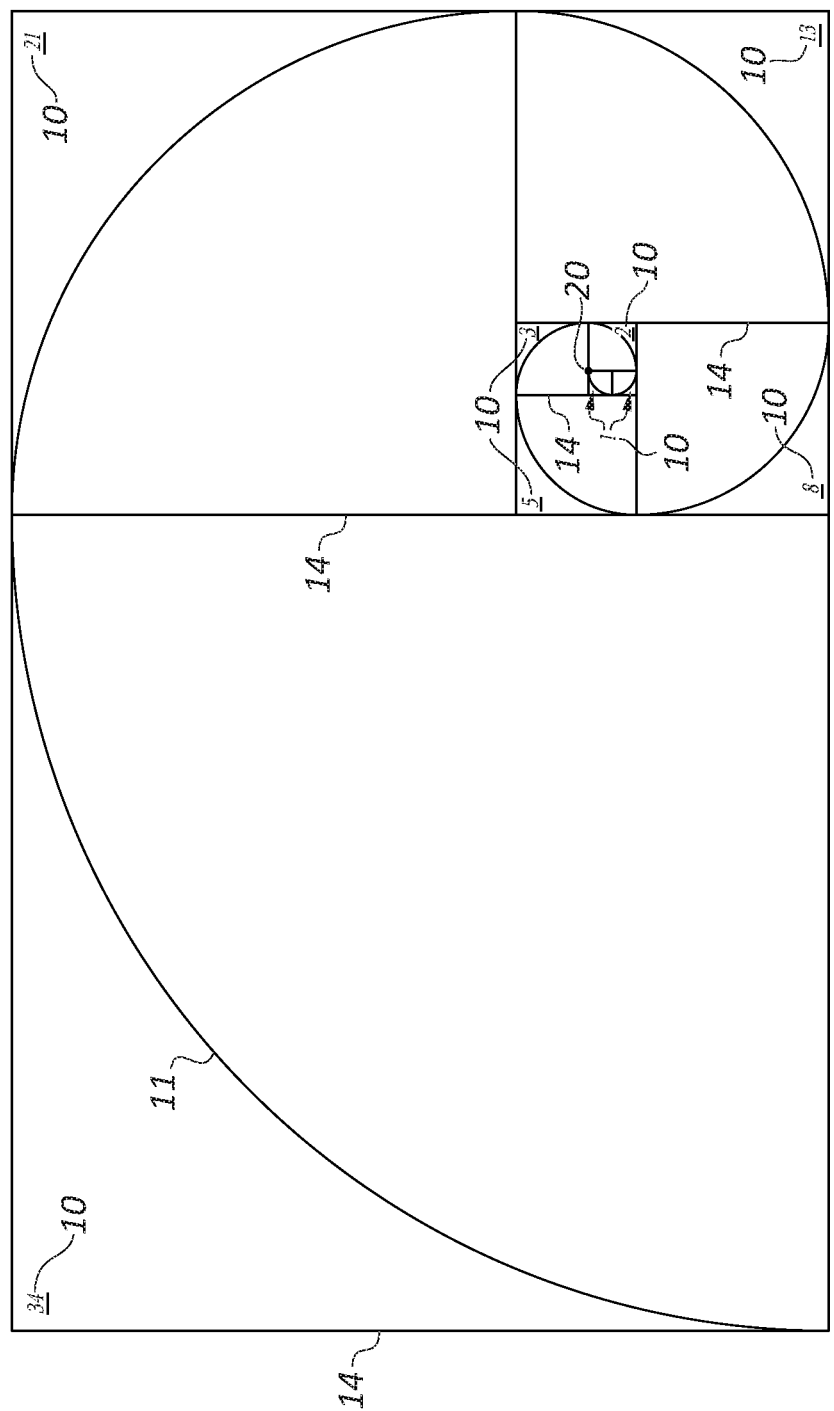
FIG. 1 is a schematic representation of an example Fibonacci spiral, namely, an approximation of the Golden Spiral created by drawing circular arcs connecting the opposite corners of squares in the Fibonacci tiling, the example in FIG. 1 using squares of relative sizes 1, 1, 2, 3, 5, 8, 13, 21, and 34.

In nature growth frequently occurs in geometrically proportionate ways or patterns. These growth patterns have been linked to related mathematical expressions referred to as the "Fibonacci Sequence" and the "Golden Ratio." As shown in FIG. 1 dimensions of adjacent squares 14 and respective segments of Spiral 12 corresponding to numbers 10 of a Fibonacci Sequence (1, 1, 2, 3, 5, 8, 13, 21, 34) grow at a rate similar to that of Phi (ED, i.e., the Golden Ratio), 1.618, for each quarter turn from the center point 20. The Fibonacci Spiral, e.g., the spiral 12 described below with reference to FIG. 1, and the Golden Spiral—i.e., a spiral that grows at a rate corresponding to the Golden Ratio—are very close approximations of one another and are considered equivalents for purposes of the present invention.

These natural growth patterns are often expressed in the spiral shape, for example, as seen in the nautilus shell, snail shell, fern, arrangement of sunflower seeds on a sunflower, and so on, a spiral being a curve on a plane that winds around a fixed center point at a continuously increasing distance from the center point. In natural growth of plants there is no simpler law than this, namely that it shall widen and lengthen in the same unvarying proportions.

Figure 2:
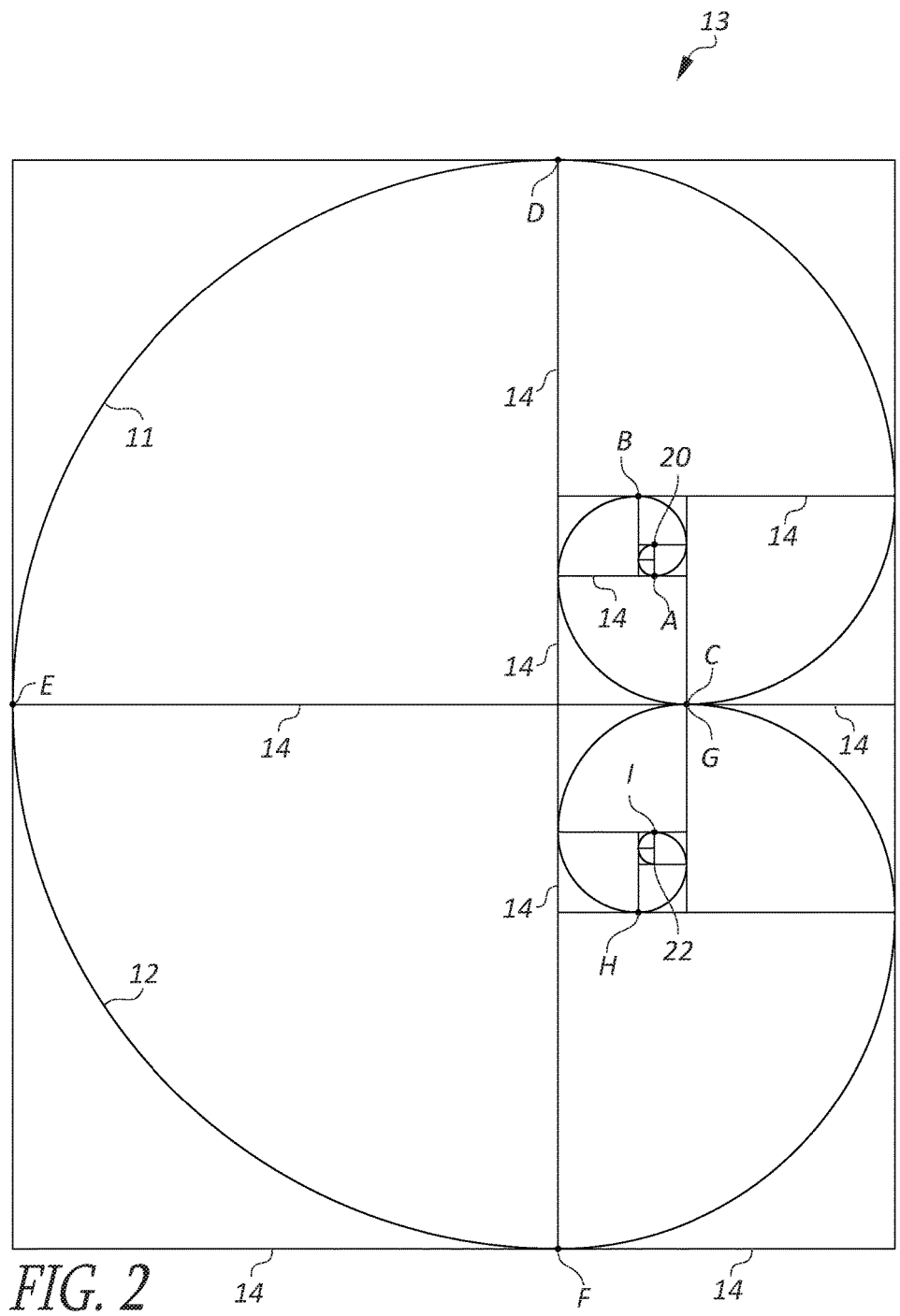
FIG. 2 is a schematic view of two example Fibonacci spirals arranged in mirrored positions with points placed along the arcs of the spirals lettered from A-I, the lettered points being used for reference in FIGS. 3 and 4.

FIG. 2 is a plan view showing two Fibonacci Spirals 11, 12 in mirrored positions, forming a double-opposed Fibonacci Spiral 13, with tiling squares 14 and respective center points 20, 22. This arrangement of the Fibonacci Spirals 11, 12 provides the mathematical basis for the dimensions of the coiled frame (38) described below with reference to FIG. 5, whether scaled up or down in size. Points A-I are points of reference to be used in FIG. 3 and FIG. 4.

Figure 3:
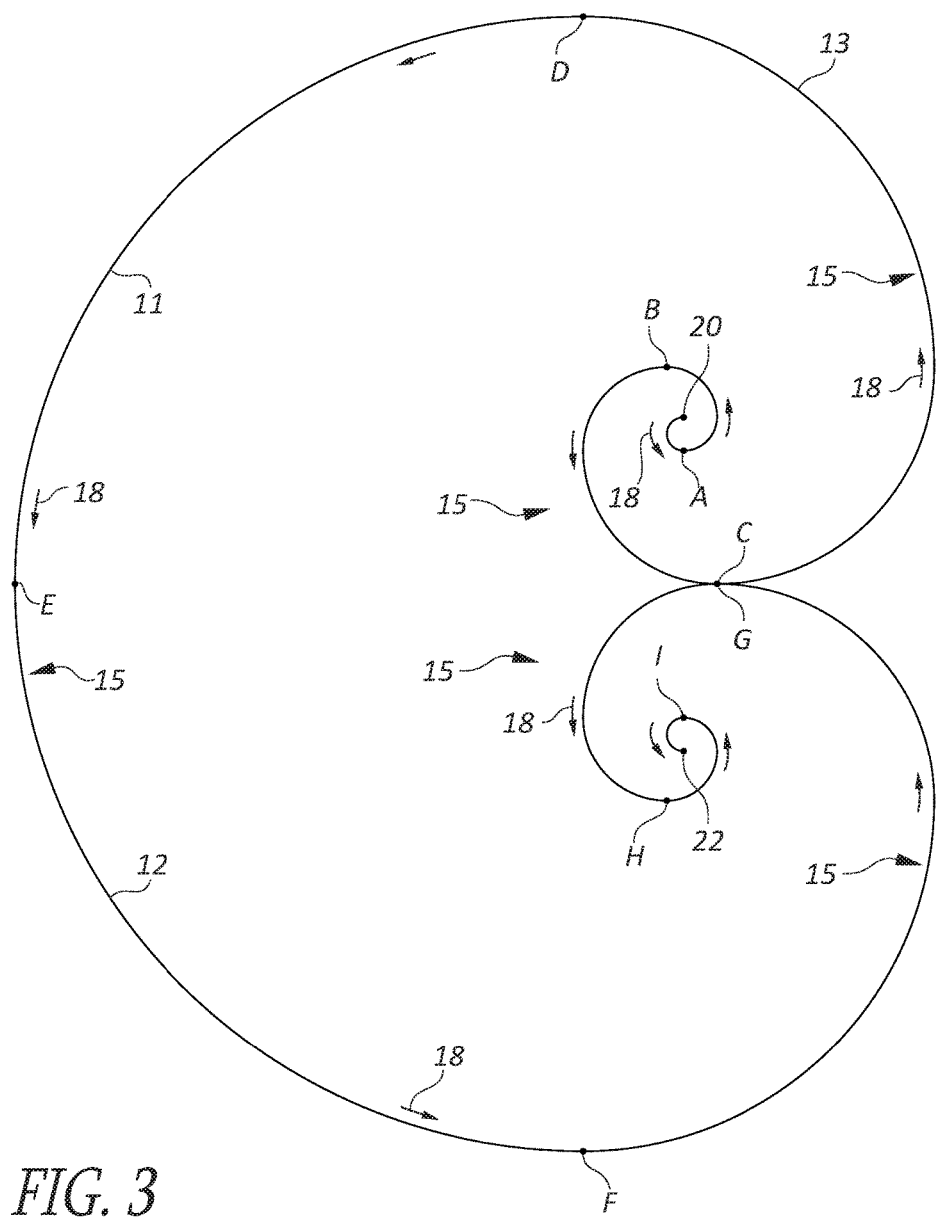
FIG. 3 is a schematic view of the two example Fibonacci spirals without tiling squares, and with lettered points for reference, the spirals being continuous and having arrows to show the direction of spiral expansion and spiral contraction, the arrows also being used for reference with respect to FIG. 4 where a pitch is applied to the spirals.

FIG. 3 is a plan view showing the double-opposed Fibonacci Spiral 13 with the tiling squares removed. The arrows 18 show the direction of the spiral's expansion, from center point 20 to point E, and contraction, from point E to center point 22, and that they are continuous from center point 20 to center point 22. Various arcs 15 of the spiral 13 are indicated for reference.

Figure 4:
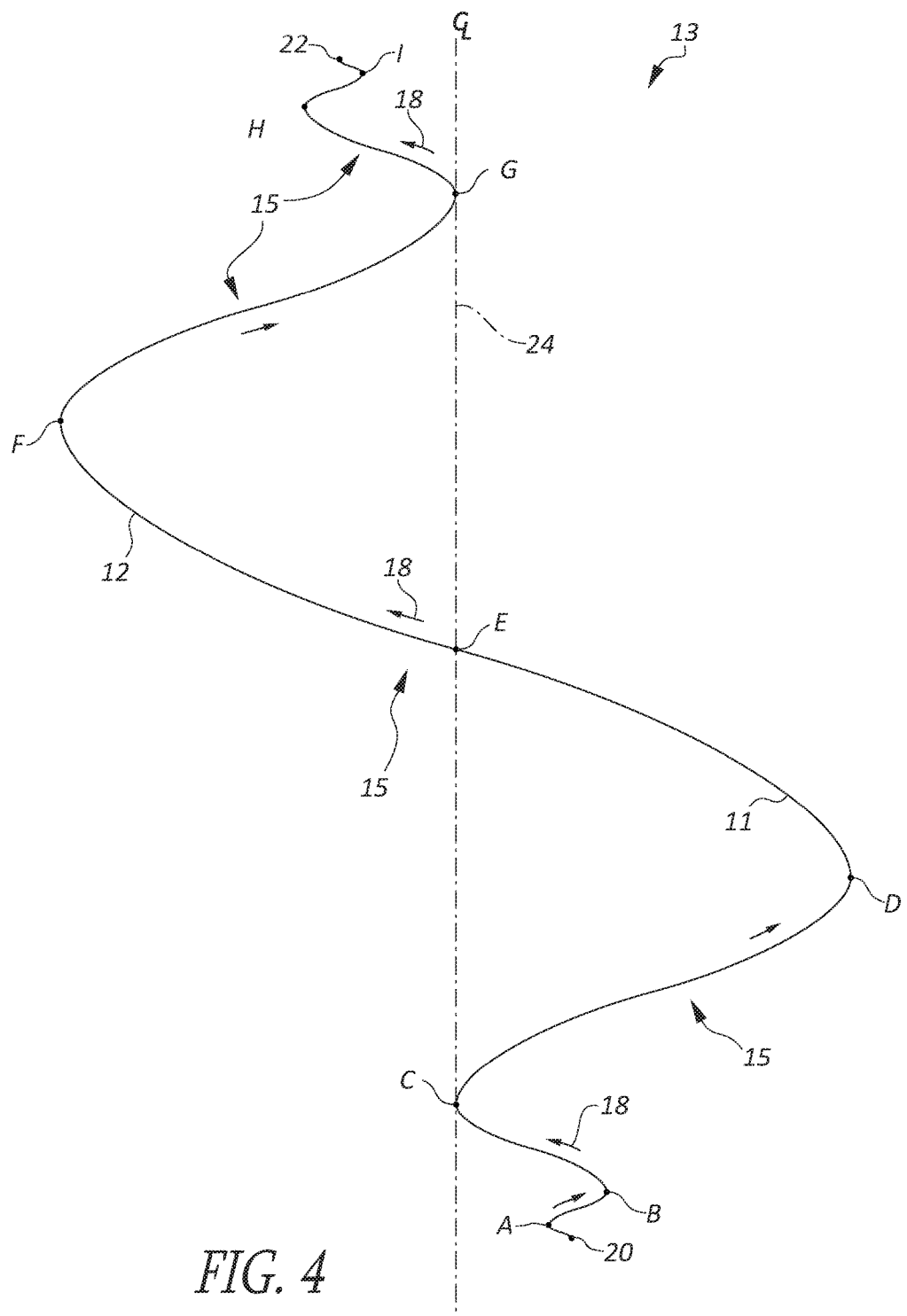
FIG. 4 is a side schematic view of expanding and contracting Fibonacci spirals having an example 30° pitch, with lettered points and arrows corresponding to FIG. 2 and FIG. 3.

FIG. 4 shows a side view of the double-opposed Fibonacci Spiral 13 of FIGS. 2 and 3 with a pitch applied. The arrows 18 show the direction of spiral expansion and contraction. Beginning with the lower center point 20 the Fibonacci Spiral 11 expands until it crosses the center line 24 at point E. The Fibonacci Spiral 12 then contracts the same or approximately the same number of turns before ending at the upper center point 22. The pitch applied in the example in FIG. 4 is 30° or 33%, though other pitches may be applied, depending for example on the type of plant. It should be noted that FIG. 4 is 2-dimensional and therefore does not describe the depth of the arcs 15, shortening the apparent distance between points A and I, and having the effect of increasing the appearance of the applied pitch, particularly at the reference points A, B, C, D, F, G, H, and I.

Figure 5:
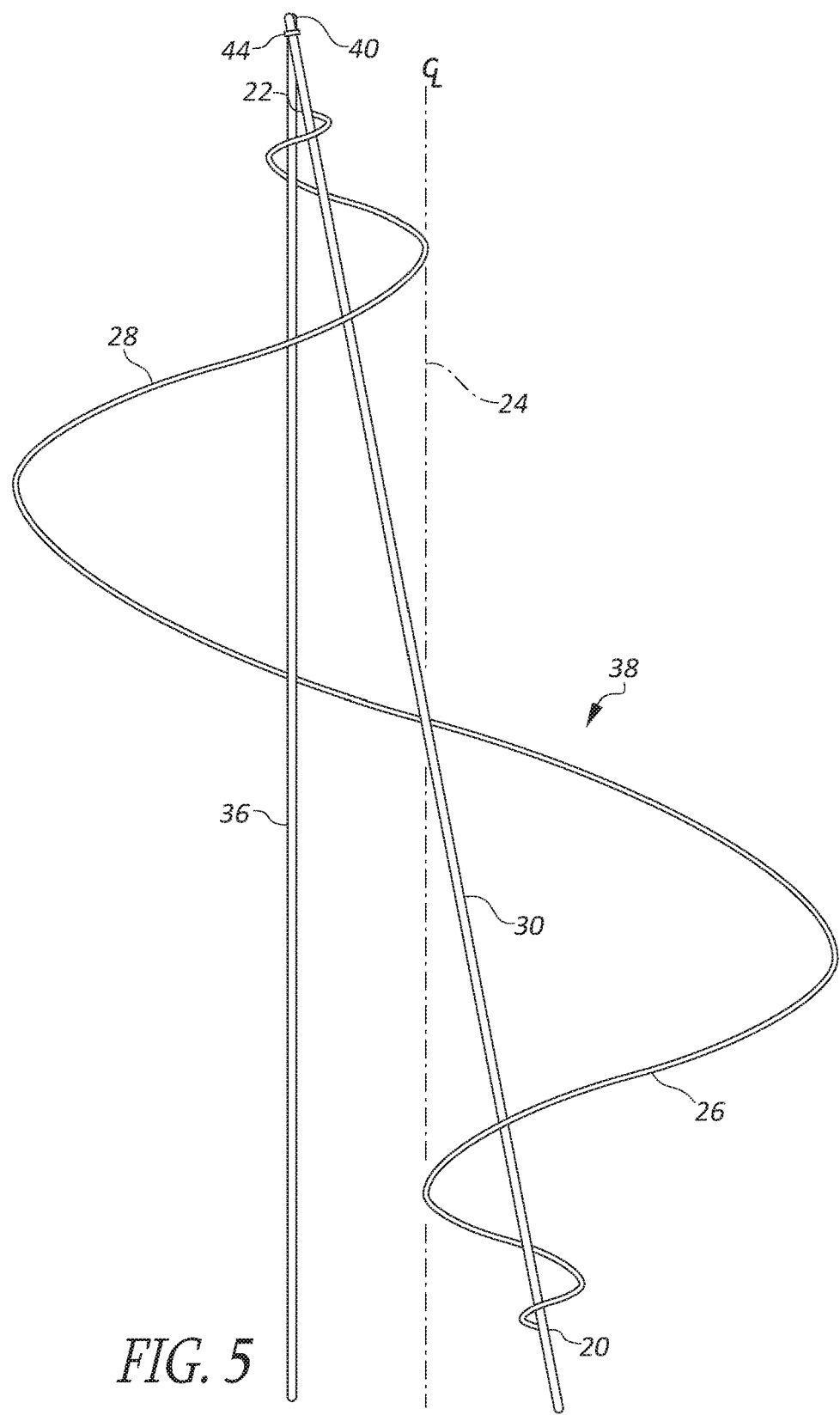
FIG. 5 is a side view of a coiled frame in accordance with the present invention, having a pitched, double-opposed Fibonacci spiral configuration that correlates to that of FIGS. 2-4, with the lettered points and arrows having been removed and with stakes connected to attachment points at each end of the coiled frame.

In accordance with an exemplary embodiment of the present invention, FIG. 5 is a side view showing a coiled frame 38. As shown, the coiled frame 38 includes upper and lower Fibonacci Spiral portions 26 and 28 that correspond to the configuration of the Fibonacci segments 11 and 12 shown in FIGS. 2-4. The frame 38 is suitably constructed of bent wire, though other materials may be used, such as extruded plastic, composites, wood, bamboo, or tubing, for example. Furthermore, while the frame may be in the form of a self-supporting coil as shown, it will be understood that some embodiments may include spokes, struts, webs, and other forms of internal and/or external structure as well.

In FIG. 5 The coiled frame 38 is shown attached to an angled support stake or rod 30 that parallels/passes alongside the center points 20, 22 at respective ends of the frame. The stake 30 is preferably angled between 1-89° with respect to vertical as indicated by the vertical axis 24, with an angle of about 80° being preferred to maximize utilization of light resources in many applications. A second stake 36 extends generally vertically and meets at apex 40 of the angled stake 30. Using a cable tie 44 or other connector, a joint is formed at the point 40 where the second stake 36 and the angled stake 30 meet, thus forming a triangular shaped configuration that provides stability and ease of use.

Figure 6:
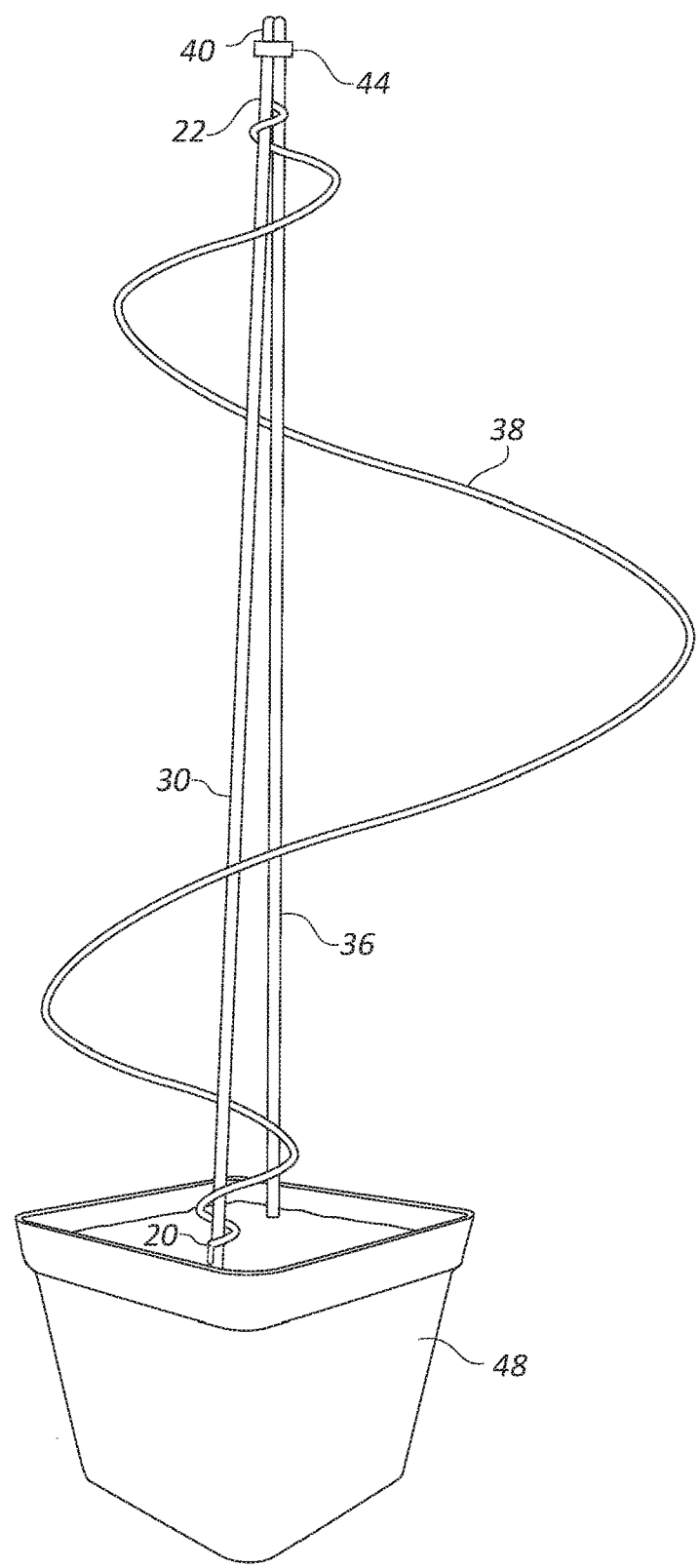
FIG. 6 is a front perspective view of the coiled frame of FIG. 5, attached to an angled stake, supported by an additional stake and set in a pot with soil and no plant.

FIG. 6 is a front perspective view of the coiled frame 38, attached to an angled stake 30, supported by an additional stake 36 and set in a pot 48 with soil 50.

Figure 7:
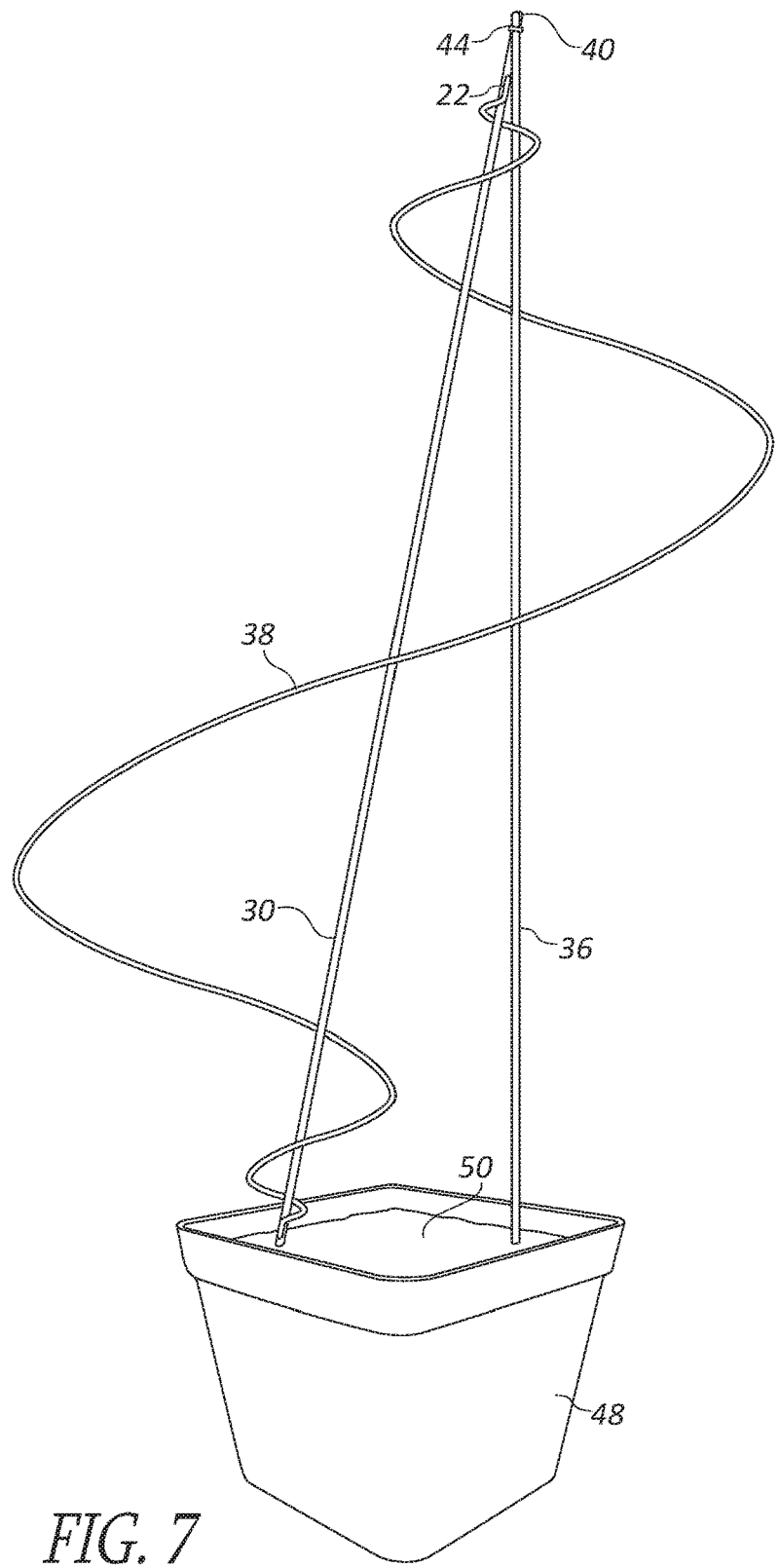
FIG. 7 is a side perspective view of the coiled frame of FIG. 5, attached to an angled stake, supported by an additional stake and set in a pot with soil and no plant.

FIG. 7 is a side perspective view—from the side opposite that shown in FIG. 5—of the coiled frame 38, attached to an angled stake 30, supported by an additional stake 36 and set in a pot 48 with soil 50.

Figure 8:
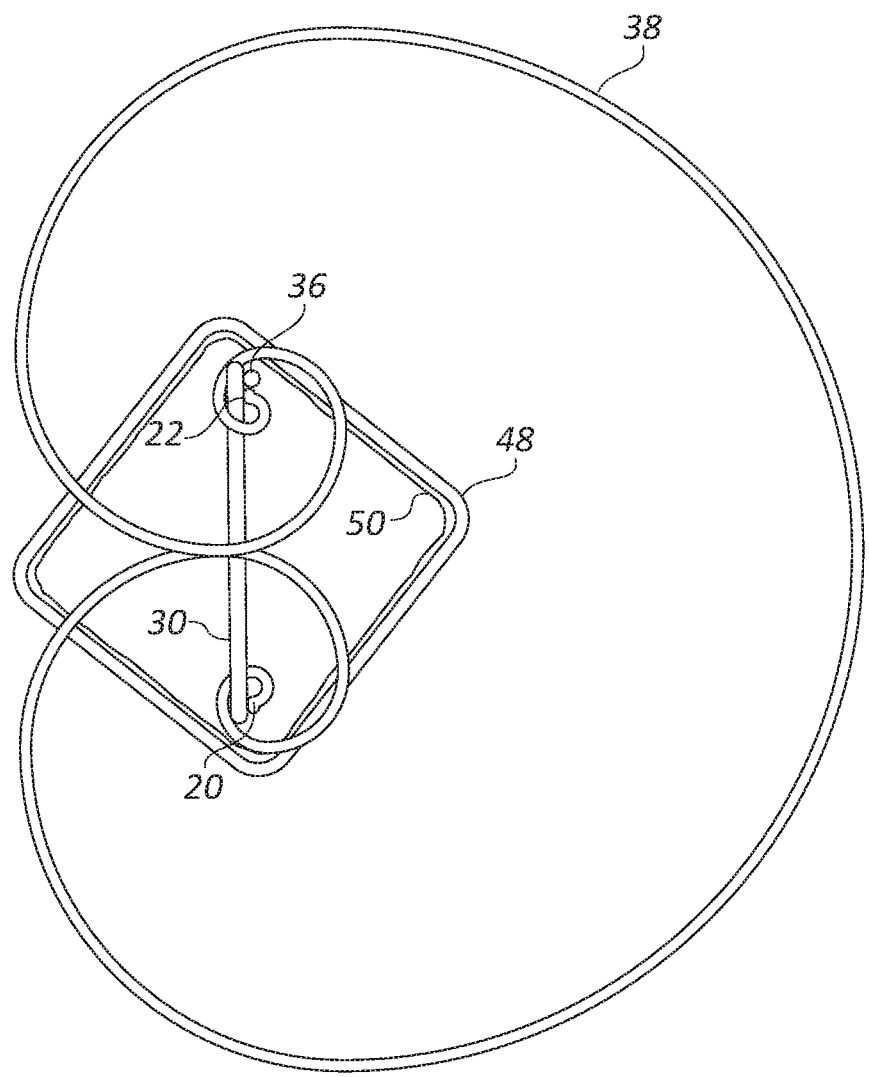
FIG. 8 is a top plan view of the coiled frame of FIG. 5, attached to an angled stake and set in a pot with soil and no plant.

FIG. 8 is a top plan view of the coiled frame 38 of FIG. 5, attached to an angled stake 30 and set in a pot 48 with soil and no plant.

Figure 9:
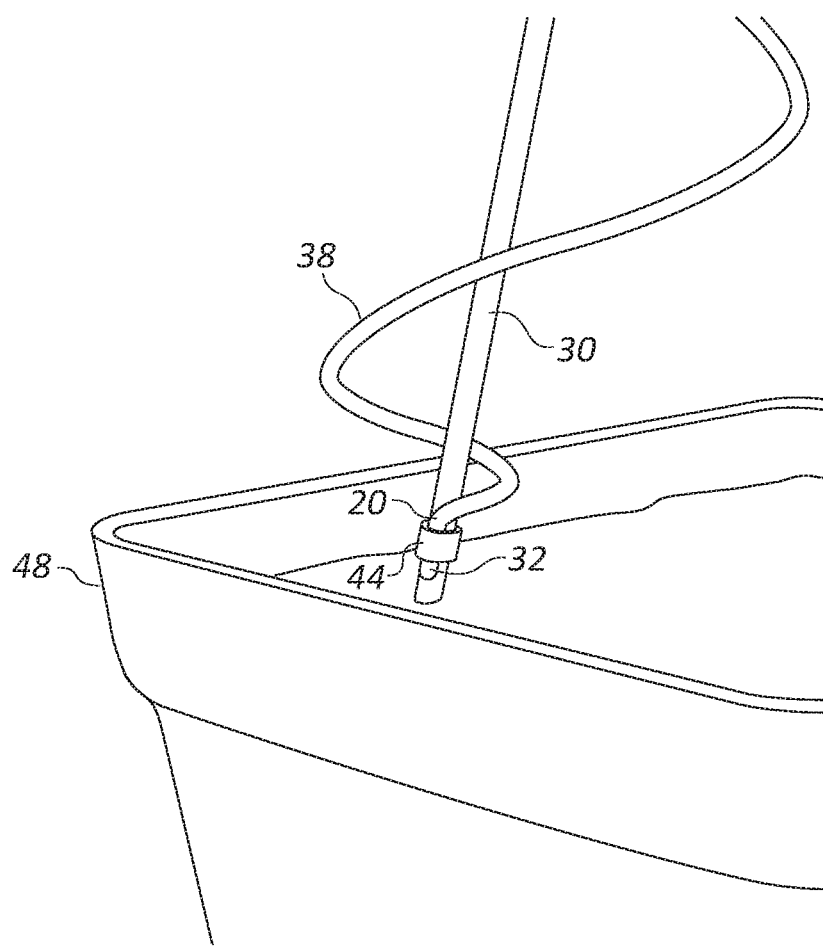
FIG. 9 is an enlarged perspective view of the coiled frame of FIG. 5, showing the lower attachment point in greater detail.

FIG. 9 is an enlarged perspective view of a portion of the coiled frame 38 showing a lower attachment portion 32 of the spring 38. The lower attachment portion is a continuation of the wire spring 38, and is angled out from the bottom spiral center point 20. The lower attachment portion 32 is secured to the angled stake 30, using a cable tie 44 or other connector, for example.

Figure 10:
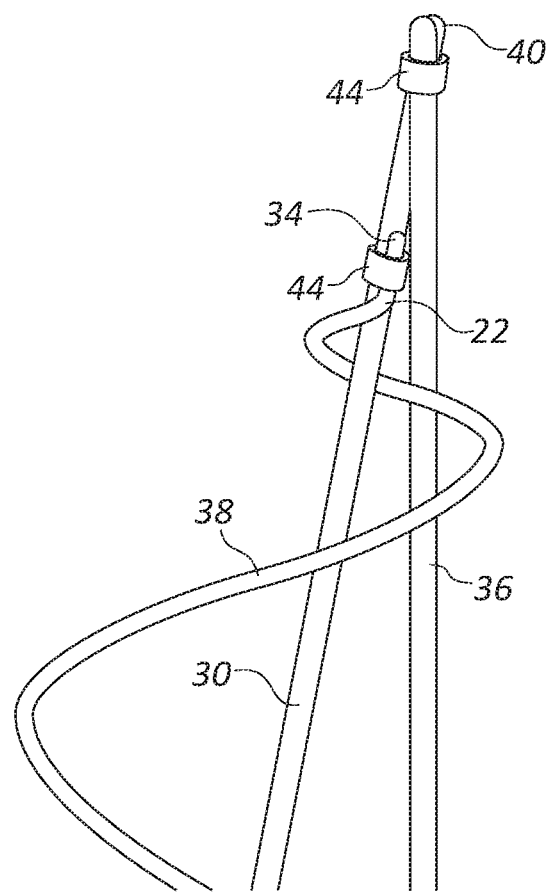
FIG. 10 is a second enlarged perspective view of the coiled frame of FIG. 5, showing in greater detail the upper attachment point and the joint formed by the angled stake and support stake.

FIG. 10 is an enlarged perspective view of a second portion of the coiled frame 38, showing an upper attachment portion 34 of the spring 38. The upper attachment portion 34 is a continuation of the wire spring 38, and is angled out from the top spiral center point 22. The upper attachment portion 34 is secured to the angled stake 30, using cable ties 44 or other connectors, for example. Also shown is the connection of the angled stake 30 and the second stake 36 at the apex 40 of the angled stake.

Figure 11:
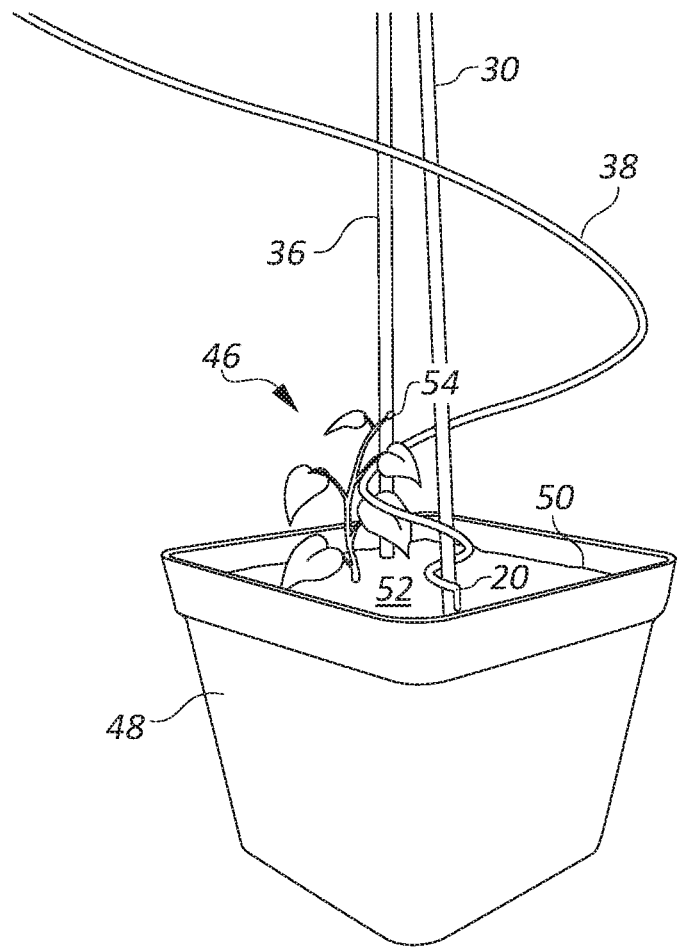
FIG. 11 is a perspective view of the coiled frame of FIG. 5 attached to an angled stake and supported by an additional stake, and set in a pot with soil together with a plant.

FIG. 11 is a perspective view of the coiled frame of FIG. 5 attached to an angled stake and supported by an additional stake, and set in a pot with soil together with a plant.

In accordance with a method of the present invention a plant 46 may be trained to spring 38 as follows. As can be seen in FIG. 11 a young plant 46 is first planted in the soil 52 or other medium. Before any training is applied a period of time is allowed to pass so that the plant 46 may become established and begin to expand its roots into the newly available soil/medium 52, in its new location/pot 48. However, setup of the spring 38 may be done at this point rather than later, which will reduce the possibility of driving a stake through the newly formed roots. The angled stake 30 is set into the soil 52 so the spring 38 will be positioned in a manner that the spring 38 and plant 46 will intersect as the plant 46 grows vertical. It is preferable to have this intersection between plant 46 and spring 38 take place as close to the soil line 50 as possible, and also as close to the center point 20 of the base of the spring 38 as possible. In so doing, care should be exercised that the stake 30 is not inserted into the root ball in order to avoid injuring the young plant 46. The spring 38 may be slid down the angled stake 30 by guiding the stake 30 through the bottom and top center points 20 and 22 of the spring 38 until the preferred distance between the soil line 50 and the bottom center point 20 of the spring 38 is reached. The spring 38 is rotated around the stake 30 until the pitch of the spring 38 is in proper relationship to the soil line 50. For example; if the pitch of the spring 38 is set at 30° then it is attached to the stake 30 so that the 30° pitch is maintained in relation to the soil line 50.

The spring 38 is then attached, using cable ties or other connectors 44, to the angled stake 30 by way of the attachment portions 32 and 34 located at the bottom and top center points 20 and 22. In the illustrated embodiment the attachment portions 32 and 34 are a continuation of the spring 38 using the same material (see, also, FIGS. 9 and 10), although separate pieces may be employed in some instances. The attachment portions 32 and 34 are angled out the top and bottom center points 20 and 22 and aligned with the angled stake 30 for accessibility, attachment and removal. The second stake 36 is positioned in the soil 52 at or near vertical and so the uppermost portion 40 of the stake 36 intersects with the uppermost portion of the angled stake 30. The second stake 36 stabilizes the position of the angled stake 30 and the spring 38. Before attaching the second stake 36 to the angled stake 30, check for proper positioning of the pitch of the spring in relation to the soil line 50.

After the plant 46 has begun to establish new roots and shoots an assessment of the plant's 46 readiness for bending is conducted. First the apical growth tip 54 is ascertained to be above the position on the spring 38 where attachment and training/tuning is to begin. Bending may be carried out at a location spaced down from the tender growing tip where the stem has begun to harden but is still receptive to bending without breaking. It is when this hardened yet supple part of the stem is directly across from the selected position, on the spring that the movement of bending the stem is to be carried out.

Figure 12:
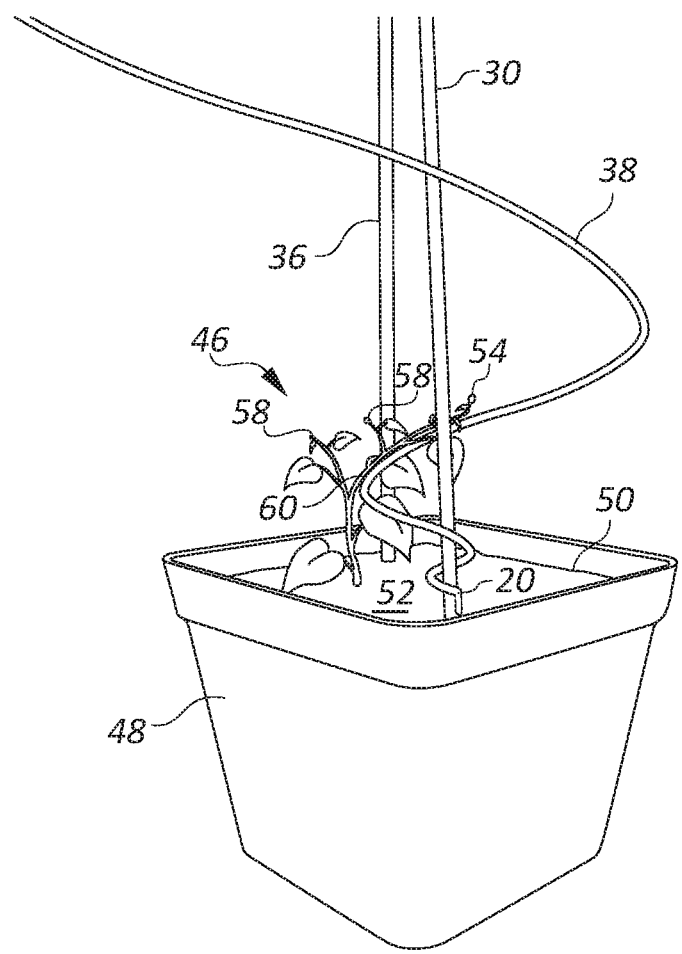
FIGS. 12-15 are perspective views of the coiled frame of FIG. 5, attached to an angled stake and supported by an additional stake, and set in a pot with soil and a plant attached thereto and growing up the frame.
Figure 16:
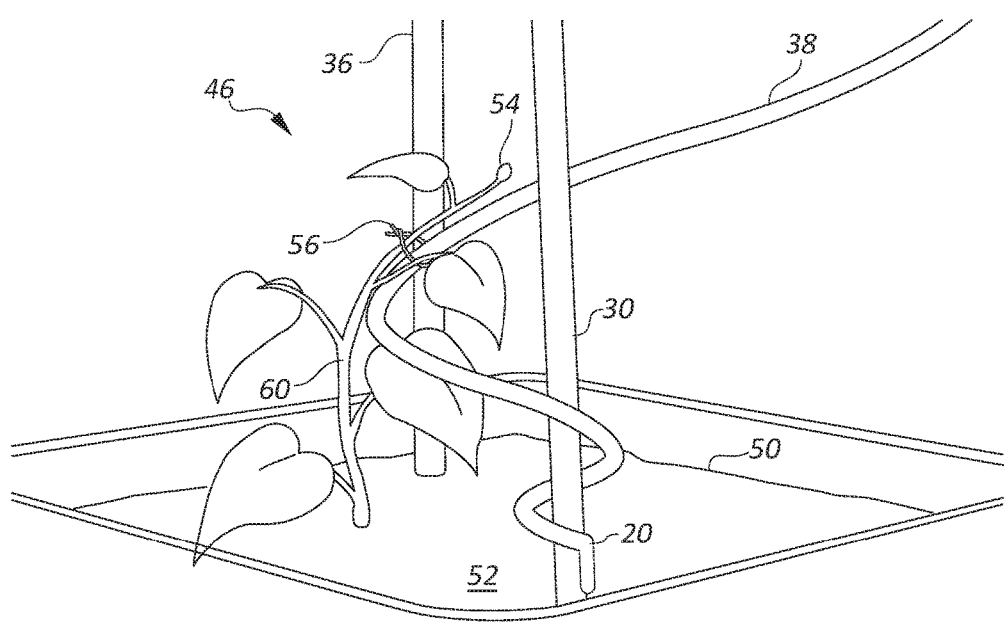
FIG. 16 is an enlarged perspective view of the coiled frame of FIG. 5 attached to an angled stake, showing in greater detail the first attachment of the plant to the spring shaped frame.
Figure 17:
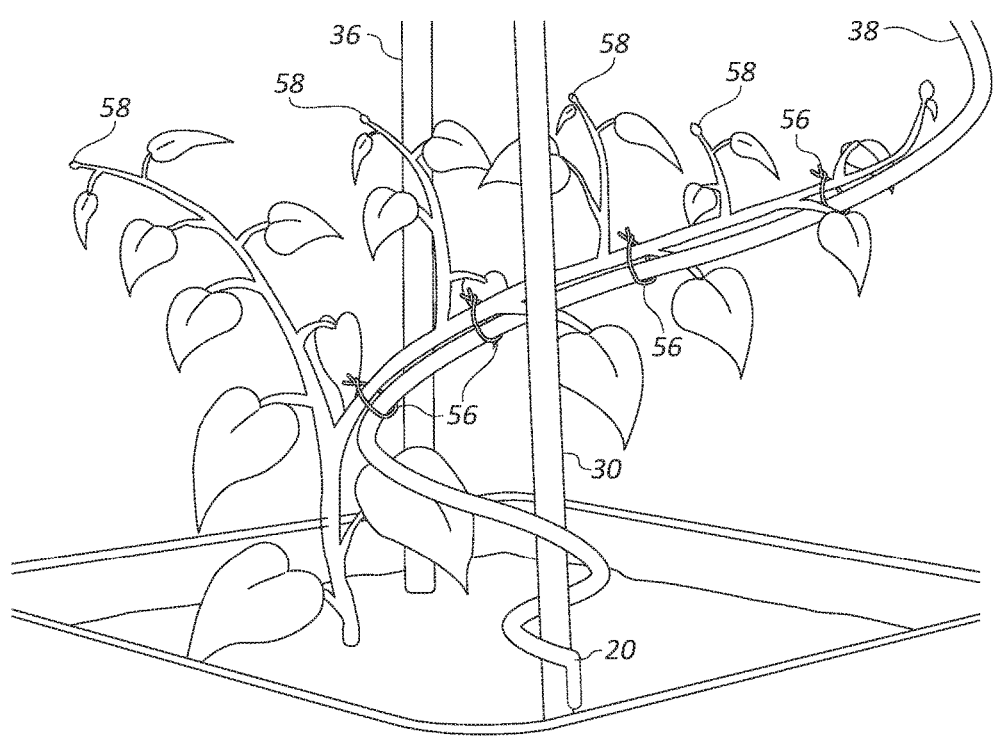
FIG. 17 is an enlarged perspective view of a plant attached to and growing up the coiled frame of FIG. 5.

As can be seen in FIGS. 12 and 16, the stem 60 is bent so that the arc of the bend is as open as possible. Sharp bends are preferably avoided as these could cause unnecessary damage to the plant 46. The arc of the bend may be from the soil line 50 to the position on the spring 38 where training/ 'apical tuning' is to begin, i.e., the first connection point. Using a form of wire, clip, string 56 or other connector the hardened/supple portion of the plant 46 is tied down/attached to the spring 38. Again it is preferable to leave the fragile growing tip 54 alone and that it not be tied down to the spring 38.

Figure 13:
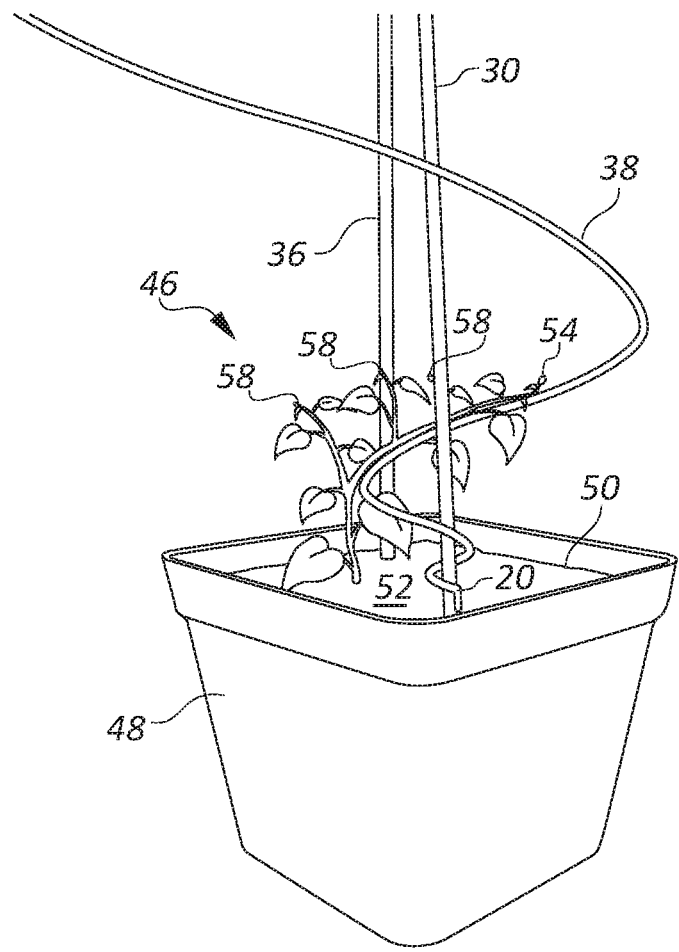
Figure 14:
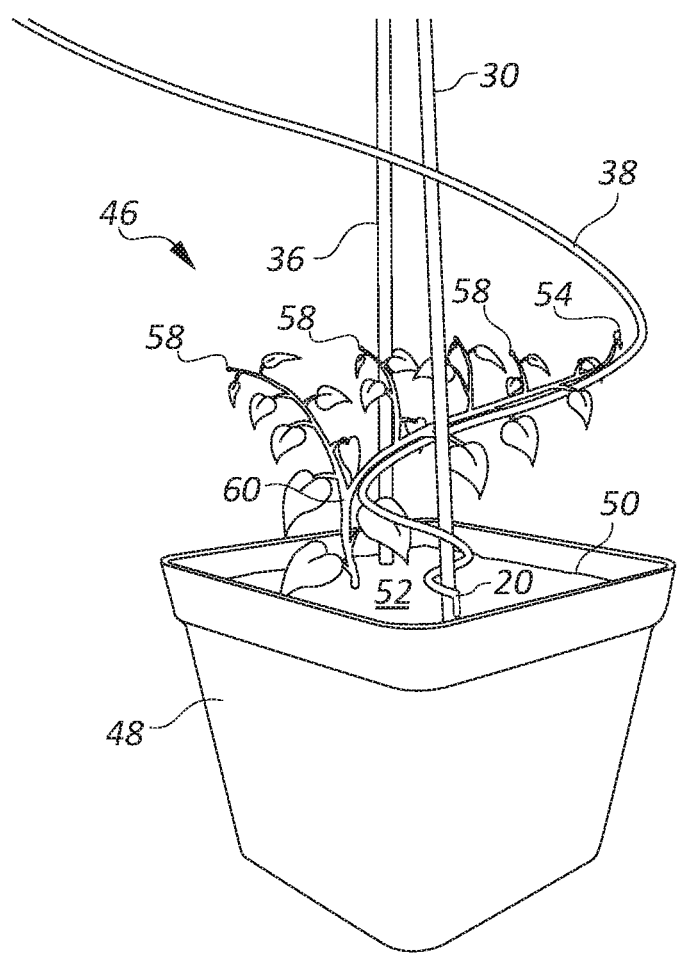
Figure 15:
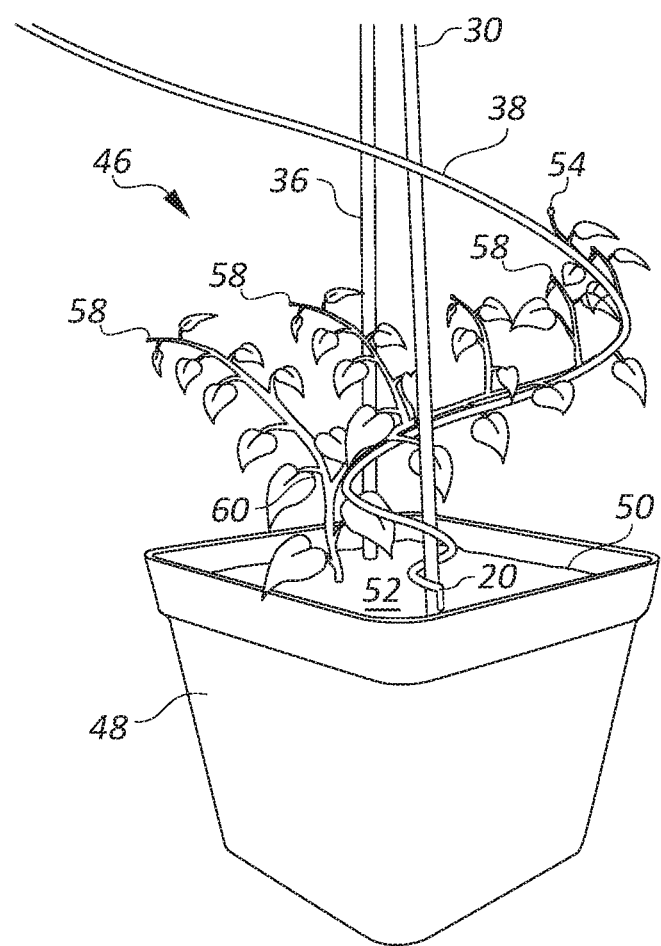

The plant 46 is then observed as it reorients to its new position so that the apical growing tip 54 begins to grow vertical again due to the effects of phototropism and gravitropism. This new position overcomes the apical dominance of the apical growing tip 54 and the effect of auxin on the axillary shoots 58 is diminished while the increased exposure to light enhances axillary shoot 58 growth, and thus the axillary shoots 58 turn vertical 64 as well. Axillary shoots 58 may be thinned out, or left alone as determined/decided by the grower. Subsequently, as shown in FIG. 13, the apical growth tip 54 (what was the original apical shoot) is attached further up the arc of spring 38 at a second connection point. Readiness for bending is again assessed in the manner described above, and another bend is then applied to an appropriate spot in the stem. The second bend, training the plant 46 up the arc and pitch of the spring 38, continues to overcome apical dominance and exposes new axillary shoots 58 to light, thus enhancing their growth, as can be seen in FIGS. 14-15. A sequence of additional bends are applied to the original apical shoot 54, in the same manner up the arc of the spring 38, continually overcoming apical dominance and exposing more axillary shoots 58 to light. Finally the original apical shoot 54 may be allowed to continue its vertical growth when the desired number of evenly proportioned branches and shoots has been obtained and apical dominance is sufficiently overcome.

The above steps for training the apical tip can be applied to any desired stage in the life cycle of the plant (e.g. flowering and fruiting) and to any growing tip on the plant that may benefit from training to overcome apical dominance. Springs 38 of varying scale/dimension/pitch, while maintaining the Fibonacci/Golden Spiral pattern, can be applied to a wide range of growing situations where apical dominance is of concern.

It has been found, through the use of the present invention, that by applying the Fibonacci Spiral to a wire, which is then pitched to a desired degree to form a double-spiral coiled support as shown in FIG. 5, an effective means of overcoming apical dominance without removal of the apical shoot is provided. Furthermore, the arc 15 of the spring 38 opens up the plant in accordance with natural growth patterns and increases exposure to axillary shoots 58 and leaves. As the plant grows larger the Fibonacci Spiral continues to open up, increasing space for more and larger leaves, stems and shoots. The pitch applied to the arc 15 of the spring 38 provides control in overcoming apical dominance. Thus the desired pitch of the spring 38 relates to independent growth behaviors/patterns of various plant type (e.g. slow growing plants may prefer a lower pitch and fast growing plants a higher pitch). When the appropriate pitch is applied to the Fibonacci Spiral for the plant being grown upon it, a harmonizing of growth is found. That is, the apical growth tip 54 and the axillary shoots 58 find an even pace of vertical growth 64 that continues to increase the number of evenly proportioned shoots/branches as long as the apical growth tip 54 is continually attached back to the spring 38. This technique can for purposes of the present invention be referred to as "Apical Tuning" or "Tuning the Apex." Once the desired plant size is achieved, bending may be discontinued and the apical growth tip 54 is allowed to continue vertically.

The method steps described above can be carried out rapidly with minimal labor, and require very little training to understand and perform. The system is therefore well suited to use by a large-scale commercial growing facility having multiple employees. The training of the plant can maximize utilization of artificial light and other resources supporting growth of the plants and consequently reduce costs as compared with traditional growing techniques. Furthermore, the coiled support of the invention is exceptionally economical to fabricate and when compressed can be transported/stored compactly in large numbers, contributing to low cost, and can be made sufficiently durable for reuse in applications where this may be desired.

It will be understood that the scope of the appended claims should not be limited by particular embodiments set forth herein, but should be construed in a manner consistent with the specification as a whole.

What is claimed is:

1. An apparatus for controlling apical dominance in growing plants, said apparatus comprising:
    a coiled frame having the shape of a double-opposed Fibonacci spiral with an applied pitch;
    said spiral extending from a first center point and expanding for a predetermined number of approximate quarter-turns, and then contracting for a substantially equal number of approximate quarter-turns to a second center point so as to create substantially symmetrical and opposed spirals.

2. The apparatus of claim 1, wherein said frame is formed of a length of bent wire.

3. The apparatus of claim 1, wherein said frame further comprises:
    an attachment portion located at at least one of said center points of said opposed spirals that is configured to be attached to a stake member inserted through said center point and into a medium in which a plant is rooted.

4. The apparatus of claim 3, wherein said attachment portion comprises:
at least one said attachment portion located at each of said first and second center points of said opposed spirals.

5. The apparatus of claim 4, wherein said attachment portions each comprise:
an end portion of said frame that is angled so as to be attachable to said stake member extending through said center points.

6. The apparatus of claim 3, wherein said first and second center points
are offset such that said stake member will be orientated at a selected angle relative to a surface of said medium when inserted therethrough.

7. The apparatus of claim 6, further comprising:
the stake member; and
a second stake member configured to support said first stake member at said selected angle relative to said surface of said medium in a triangular relationship.

8. The apparatus of claim 1, further comprising:
a plurality of connectors that are configured to attach at least one spiral shoot to the frame at selected locations thereon.

9. A method for controlling apical growth of plants, said method comprising:
on a frame having the general shape of a double-opposed Fibonacci spiral, said spiral extending from a first center point and expanding for a predetermined number of approximate quarter-turns and then contracting for a substantially equal number of approximate quarter-turns to a second center point so as to create substantially symmetrical and opposed spirals:
bending an apical growth tip of a plant at a first connection point on said frame and attaching said apical tip thereto;
allowing said plant to grow so that said apical tip advances from said first connection point; and
bending and attaching said advancing apical growth tip at successive connection points along said first and second opposed spirals of said frame as said apical tip advances.

10. The method of claim 9, wherein the steps of attaching said apical growth tip of said plant to said first and successive connection points on said frame comprise:
bending said apical growth tip to meet said connection points on said frame at locations on said apical growth tip where the stem tissues are sufficiently hardened to avoid damage when bent.

11. The method of claim 9, further comprising the step of:
orientating said frame to said medium so that an axis of said frame between said first and second starting points of said golden spirals extends at a selected angle to a surface of said medium.

12. The method of claim 11, wherein the step of orienting said frame so that said axis between said first and second starting points of said spirals extends at a selected angle to said surface of said medium comprises:
inserting a stake member through said first and second starting points of said golden spirals and into said medium so that said stake member extends at said selected angle to said surface of said medium.

13. The method of claim 11, wherein said selected angle is approximately 80° to said surface of said medium.

14. A device comprising:
a wire plant frame in the form of a coil with a pitch, the coil expanding in a spiral from a center point by a factor of approximately 1.618 per quarter turn; and
a first attachment portion located at the center point of the plant frame, configured to be attached to a support stake.

15. The device of claim 14, wherein the coil expands for a number of quarter turns, then contracts by an approximately equal number of quarter turns in an opposed spiral to a second center point.

16. The device of claim 15, wherein the number of quarter turns is selected according to a type of plant with which the plant frame is intended to be used.

17. The device of claim 14, comprising a second attachment portion located at the second center point of the plant frame.

18. The device of claim 14, wherein the pitch of the wire frame is 30 degrees.

19. The device of claim 14, wherein the pitch of the wire frame is selected according to a type of plant with which the plant frame is intended to be used.

* * * * *